US006697159B2

(12) United States Patent
Hui

(10) Patent No.: US 6,697,159 B2
(45) Date of Patent: Feb. 24, 2004

(54) OPTICAL DOMAIN SIGNAL ANALYZER

(75) Inventor: Rongqing Hui, Lenexa, KS (US)

(73) Assignee: The University of Kansas, Lawrence, KS (US)

( * ) Notice: Subject to any disclaimer, the term of this patent is extended or adjusted under 35 U.S.C. 154(b) by 174 days.

(21) Appl. No.: 09/907,343

(22) Filed: Jul. 17, 2001

(65) Prior Publication Data

US 2003/0016354 A1 Jan. 23, 2003

(51) Int. Cl.[7] .............................. G01J 3/45; G01J 3/28
(52) U.S. Cl. ...................................... 356/454; 356/328
(58) Field of Search ............................... 356/328, 326, 356/330, 454, 519

(56) References Cited

U.S. PATENT DOCUMENTS

| | | | | |
|---|---|---|---|---|
| H1152 H | * | 3/1993 | Korendyke | ............... 356/328 |
| 5,589,970 A | | 12/1996 | Lyu et al. | |
| 5,689,333 A | * | 11/1997 | Batchelder et al. | ......... 356/301 |
| 5,894,362 A | | 4/1999 | Onaka et al. | |
| 5,969,834 A | * | 10/1999 | Farber et al. | ............... 324/614 |

OTHER PUBLICATIONS

Webpage: www.burleigh.com/Pages/fabryTheory.htm, dated Mar. 8, 2001, *Fabry Perot Interferometers Theory*, Brian P. Samoriski, Ph.D.

Webpage: www.intl-light.com/handbook/ch04.html, dated Sep. 27, 2001, *Manipulating Light*.

Webpage: http://fusioned.gat.com/Teachers/Curriculum/Curriculum-HTML/T03S-CD-diffract.html, dated Sep. 27, 2001, *The Compact Disk as Diffraction Grating*.

*Fiber Optic Networks*, by Paul E. Green, © 1993 by Prentice-Hall, Inc., Englewood Cliffs, New Jersey, pp. 108–117.

* cited by examiner

*Primary Examiner*—Audrey Chang
*Assistant Examiner*—Denise S. Allen
(74) *Attorney, Agent, or Firm*—Blackwell Sanders Peper Martin, LLP

(57) ABSTRACT

An Optical Domain Signal Analyzer, having an optical filter, a dispersive element and a detector is utilized to provide high resolution spectrum analysis over a wide optical bandwidth. The optical domain signal analyzer broadly includes an optical filter for providing wavelength samples of a received optical signal, a dispersive element for receiving the samples and dispersing the samples, and a detector for receiving the dispersed signal and for providing electrical signals representative of the dispersed sample. A preferred embodiment includes a processor for receiving the electrical signal and calculating the characteristics of the spectrum.

28 Claims, 11 Drawing Sheets

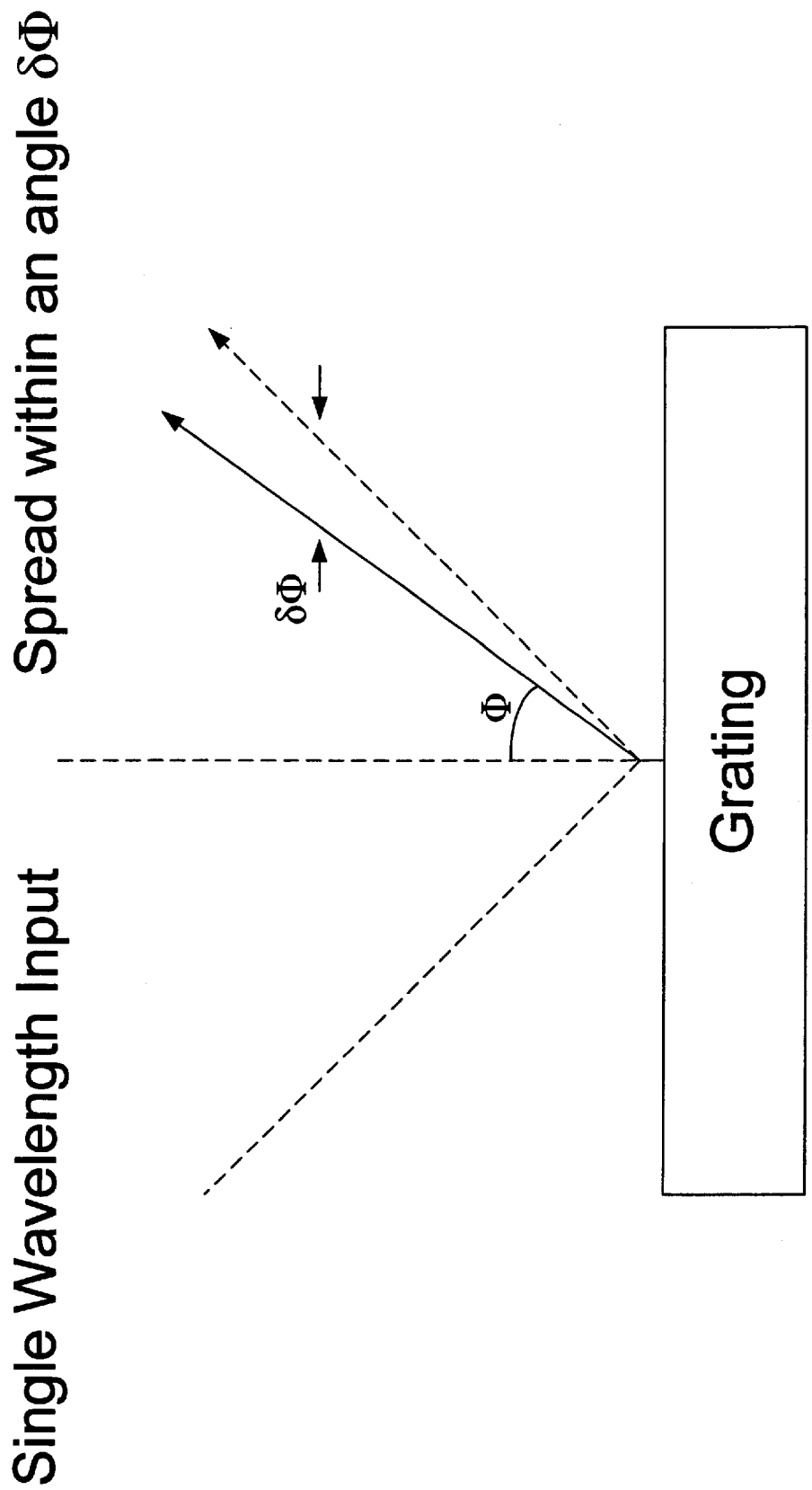

OPTICAL DOMAIN SIGNAL ANALYZER

FIELD OF THE INVENTION

This invention relates to an apparatus and method for analyzing an optical signal and, more particularly, for analyzing an optical spectrum of a Dense Wave Division Multiplexing (DWDM) system or a Frequency Division Multiplexing (FDM) system sing a tunable optical filter.

BACKGROUND OF THE INVENTION

Dense Wave Division Multiplexing (DWDM) is widely used in fiber optic transmission systems to expand the capacity of the fiber optic system. In a DWDM network a plurality of optical channels, each operating at a specific wavelength are transported in single fiber. Each wavelength is separated by a channel spacing in the order of, for example, 0.4 nm. As many as 160 channels are transmitted over a single fiber.

A necessary part of network management includes performance monitoring to guarantee the quality of service. Conventional link performance monitoring (LPM) is performed in the transport layer of the network in the electronics domain and on a per-channel basis. The use of DWDM necessitates optical domain performance monitoring, which measures the optical signal-to-noise-ratio, wavelength, power of each channel and other characteristics of each channel. Traditional diffraction-grating-based Optical Signal Analyzers (OSAs) are generally large in size in order to achieve a reasonable optical resolution. Photo-diode array-based OSAs are compact in size but they generally provide poor spectral resolution.

As shown in prior art FIG. 1, a depiction of a prior art analyzer 100 indicates the use of a reflective grating 102 receiving a parallel light beam from a collimator 104 and refracting that light beam to a photo diode array 106. The photo diode array 106 detects the amplitude of light signals 108 and converts them into electronic signals 110 for receipt by the signal processor 112 for processing. A data processing module 114 provides for data acquisition and processing.

Typically, the analyzer 100 provides low spectral resolution. The increase of resolution has two fundamental limitations. First, the limited number of photo diodes in the photo diode array negatively affects resolution. As the performance monitoring is provided over the 256-element photo diode array 106, only 256 effective samples are taken over the entire spectral range. The resolution may be increased by implementing a 512-element or greater photo diode array 106, but this increase in elements presents challenges in technology and manufacturing. Hence, additional elements in the photo diode array 106, in order to improve resolution, become cost prohibitive.

Second, the resolution of the reflective grating 102 is not fine enough for high resolution of the analyzer 100. For example:

$N=\lambda/\Delta\lambda$, where:

N=Number of lines in reflective grating, $\lambda$=Wavelength, and $\Delta\lambda$=Reflective grating resolution.

If the prior art analyzer 100 is desired to have a reflective grating resolution of $\Delta\lambda$=0.01 nm, and with a wavelength of 1550 nm, then:

$N=\lambda/\Delta\lambda=1550$ nm/0.01 nm=155,000 lines.

If the density of the reflective grating 102 is 600 lines/mm, then the size of the reflective grating is 155,000/600 lines/mm=258 mm which is not a feasible solution to increase resolution for a small spectrum analyzer.

Therefore, a solution is needed that would provide for a wide bandwidth monitoring and a better wavelength resolution.

BRIEF SUMMARY OF THE INVENTION

There is, therefore, provided in the practice of the invention a novel optical domain signal analyzer, for providing high resolution spectrum analysis over a wide optical bandwidth. The optical domain signal analyzer broadly includes an optical filter for providing wavelength samples of a received optical signal, a dispersing element for receiving the samples and dispersing the samples, a detector for receiving the dispersed signal and for providing electrical signals representative of the dispersed sample, and a processor for receiving the electrical signal and calculating the characteristics of the spectrum. In a preferred embodiment, the detector is a linear imaging sensor. Also, in a preferred embodiment, the optical filter is a Fabry-Perot interferometer (FPI) comprised of two parallel mirrors, each of which only partially transmit light. If constructive interference occurs in the FPI cavity, then the light with that particular frequency is transmitted from the FPI.

Accordingly, it is an object of the present invention to provide an improved optical domain signal analyzer for providing for high resolution and wide bandwidth testing of an optical signal.

BRIEF DESCRIPTION OF THE DRAWINGS

These and other inventive features, advantages, and objects will appear from the following Detailed Description when considered in connection with the accompanying drawings in which similar reference characters denote similar elements throughout the several views and wherein:

FIG. 9a is an exemplary waveform of the optical domain analyzer of FIG. 8.

FIG. 9b is a waveform of the notch filter resulting from the FPI operating in the reflective mode.

FIG. 9c illustrates the waveform resulting from the combined notch filter and the optical domain analyzer.

FIG. 11 is another cross-sectional view of the reflective grating of the optical domain signal analyzer of FIG. 2.

For the purpose of clarity in illustrating the characteristics of the present invention, accurate proportional relationships of the elements thereof have not been maintained in the Figures. Further, the sizes of certain small devices and elements thereof have been exaggerated.

DETAILED DESCRIPTION

Figure 1:
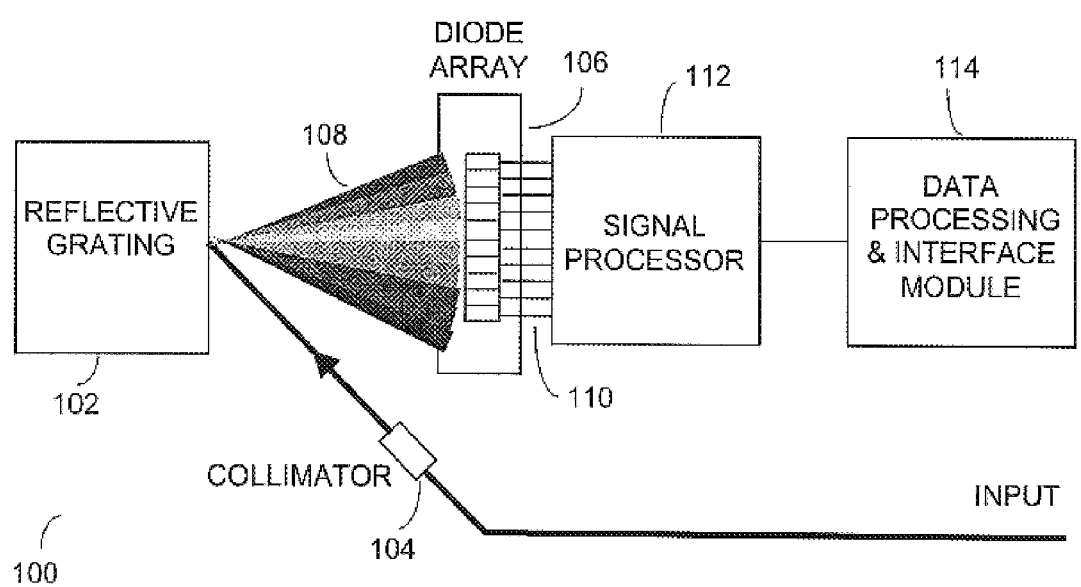
FIG. 1 is a schematic block diagram depicting an optical domain signal analyzer according to the prior art.
Figure 2:
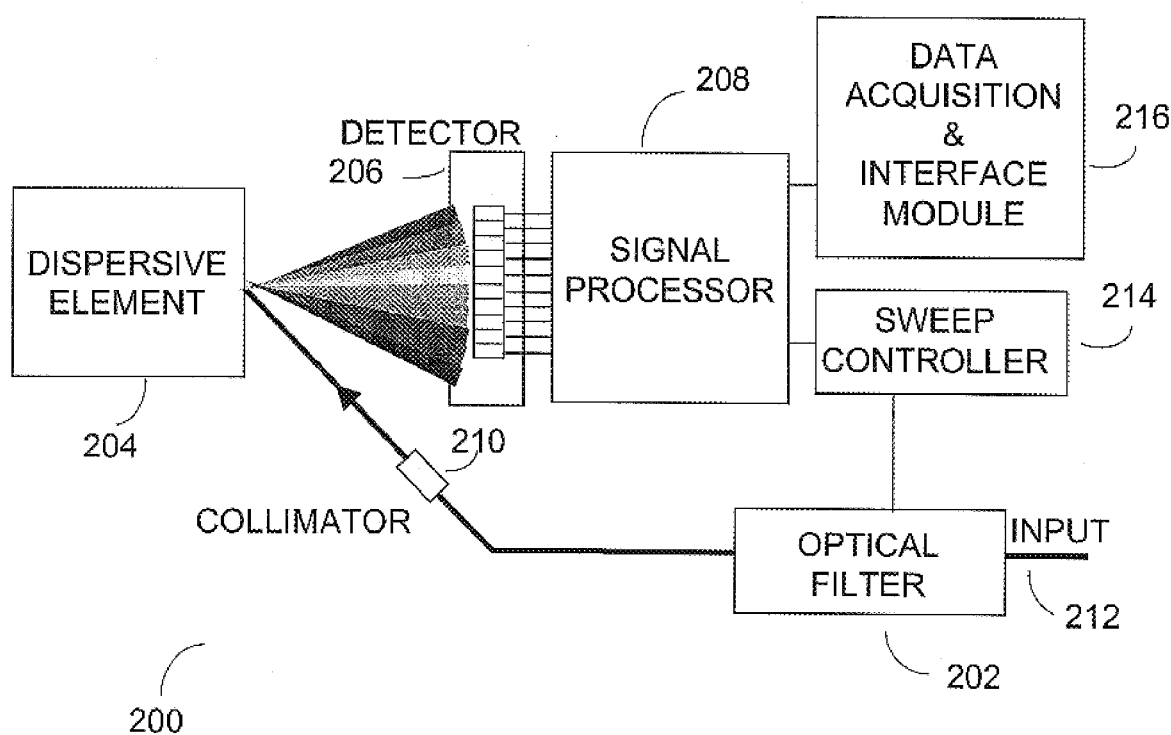
FIG. 2 is a schematic block diagram of an optical domain signal analyzer according to the present invention.

Referring to the drawings in greater detail, FIG. 2 shows an optical domain signal analyzer 200 constructed in accordance with a preferred embodiment of the present invention. The optical domain signal analyzer 200 broadly includes an optical filter 202, a dispersive element 204, a detector 206, and a processor 208 for calculating the characteristics of the spectrum. In a preferred embodiment, the analyzer 200 includes a Fabry-Perot interferometer (FPI) as the optical filter 202, a reflective grating as the dispersive element 204, and a linear imaging sensor as the detector 206. This provides a high resolution, wide bandwidth solution to monitoring the spectrum of an optical network. A preferred embodiment, shown in FIG. 8, allows for an optical notch filter, implemented through the use of a circulator 802, an optical filter 804, and an optical switch 806, to reduce the signal optical power in the area of the measured channel in order to measure the density of the wideband optical noise.

In a preferred embodiment, the optical filter 202 receives a first optical signal and provides a second optical signal. The second optical signal comprises samples of the first optical signal. The dispersive element 204 receives the second optical signal and provides a third optical signal. The third optical signal comprises a dispersion of the second optical signal. The detector 206 receives the third optical signal and provides an electrical signal representative of optical characteristics of the spectrum.

A preferred embodiment sweeps the optical spectrum according to a sweeping transfer function to produce a first optical resultant relative to a peak of the sweeping transfer function, disperses the first optical resultant, producing a second optical resultant, and registers the second optical resultant so as to produce an optical spectral density signal relative to the second resultant optical signal. Preferably, the processor 208 processes the optical spectral density signal to determine characteristics of the spectrum.

Figure 3:
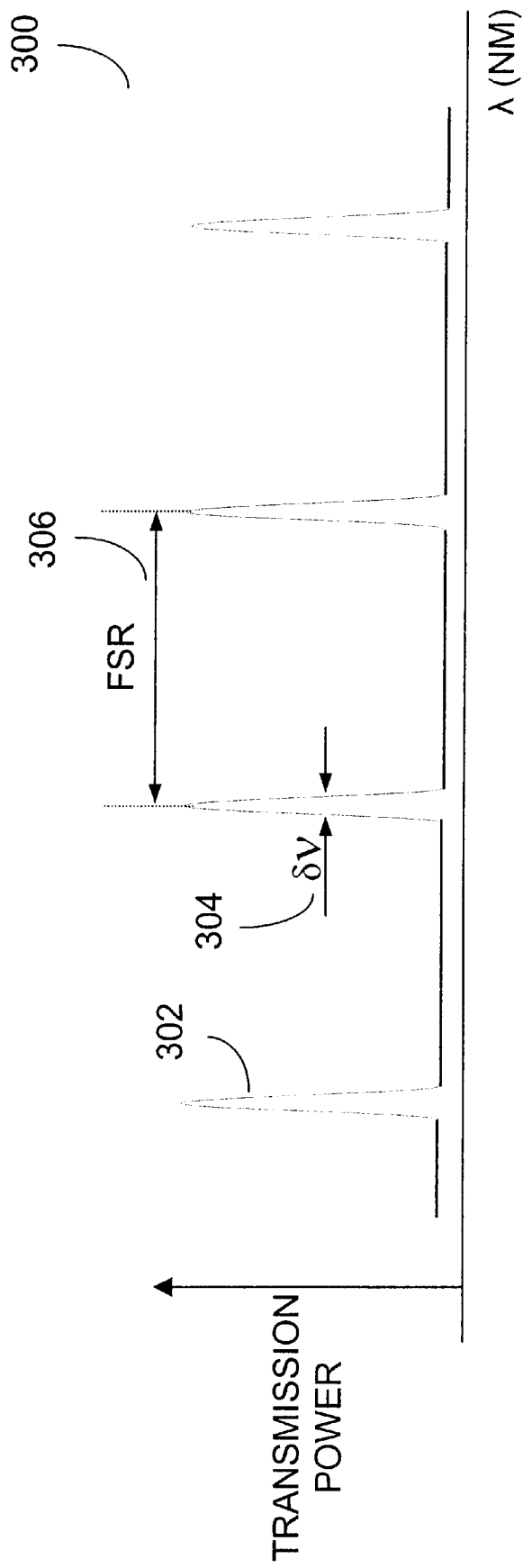
FIG. 3 is an exemplary waveform illustrating a transfer function of a Fabry-Perot interferometer.

In a preferred embodiment, the optical filter 202 is an FPI. The FPI is a tunable optical filter. As the two mirrors of the FPI only partially transmit the light beam, the beam reflects back and forth between the two mirrors. In order for constructive interference to occur, the distance between the two mirrors must be an integral multiple of the wavelength. At the location of the distance being an integral multiple, the light at that wavelength will be transmitted. At wavelengths for which the distance between the two mirrors is not an integral multiple, the transmission is much weaker. Hence, a filtering process is performed. FIG. 3 depicts the transfer function 300 of a typical FPI. Peaks 302 of the transfer function correspond to different orders of interference of a wavelength, therefore depicting that the beam is transmitted at those orders. The FPI is tunable as the distance between the two mirrors is changed by a voltage applied to the controller which controls the spacing for the mirrors. The distance may be modified smoothly, allowing for a linear scanning of frequencies and precision tuning. In a preferred embodiment, a ramp voltage applied to piezoelectric mirror spacer drives the FPI to change the wavelength of the transmitted light beam and perform a continuous sweep of the transfer function.

Spectral resolution of the interferometer is determined by width, $\delta v$, 304 of each peak of the transfer function. Width, $\delta v$, 304 is also the minimum resolvable bandwidth Free spectral range (FSR) 306 refers to the frequency separation between adjacent peaks of the orders of interference. In other words, the FSR indicates the bandwidth in which to take measurements without overlap into other orders of interference for the measured wavelength preferably using FPI. For the entire range of frequencies of a Dense Wave Division Multiplexing (DWDM) transmission range, more than one transmission peak may be used in this invention.

Finesse is a term used to measure the performance of the FPI.

Finesse=FSR/$\delta v$

Therefore, since $\delta v$ quantifies resolution, $\delta v$=FSR/Finesse would be at a lower value or more narrow resolution when the FSR is low and Finesse is high. For example, if the FSR is 32 nm, then the finesse of the FPI needs to be approximately 1000 to achieve a $\delta v$ of approximately 0.032 nm (which corresponds to approximately 4 GHz in frequency). Since it is practically difficult to achieve high FSR, a compromise between the measurement bandwidth, or FSR 306, and the spectral resolution 304 must be made. An FPI that may be used for the optical filter 202 is a Micron Optics, Model Number FPI-1550.

Referring again to FIG. 2, an input signal 212 can be a sample of the DWDM telecom spectrum. A collimator 210 renders the output of the optical filter 202 into a collimated lightwave signal. The collimator 210 can be a device that includes an end of a fiber placed at a focal plane of a lens.

Figure 4:
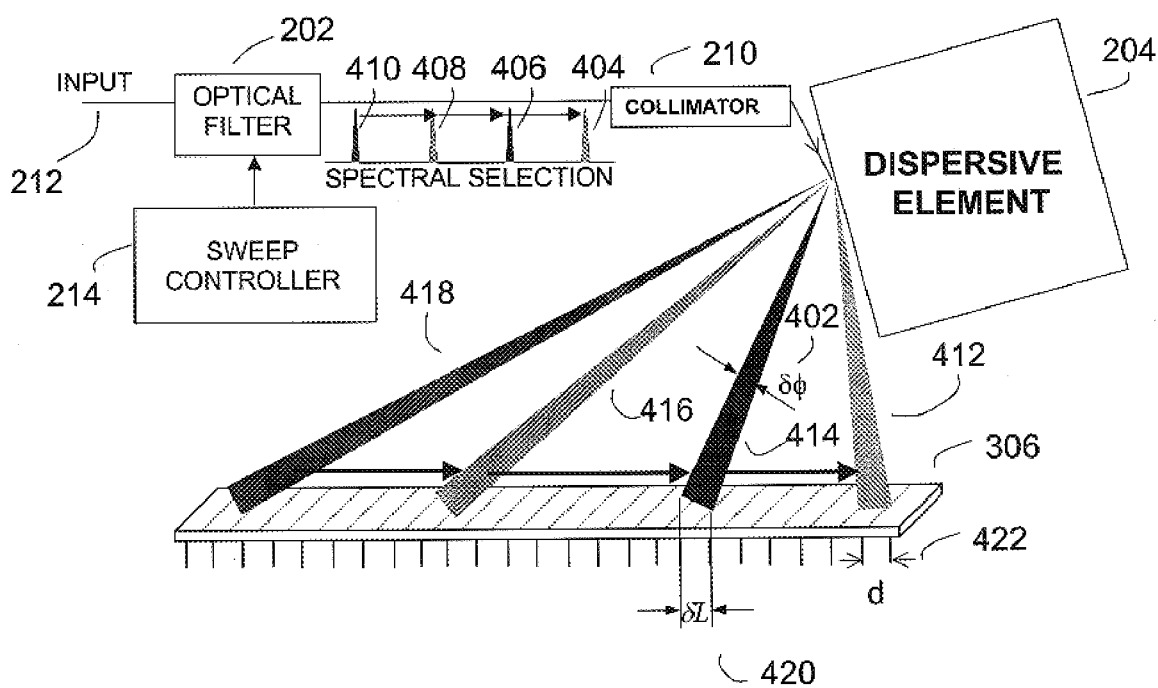
FIG. 4 is an operational view of the optical domain signal analyzer of FIG. 2.

Referring to FIG. 4, dispersive element 204 receives the collimated lightwave signal from the collimator 210 and disperses each discrete narrowband slice of the frequency domain sample into a light beam at a certain spatial angle width, $\delta\phi$, 402. At the dispersive element 204, the incident light and the reflected light are on the same side of the dispersive element. The spatial angle width $\delta\phi$ 402 depends upon the convolution between the spectral bandwidth $\delta v$ 304 and the angle resolution of the dispersive element 204.

The dispersive element 204 can be a reflective grating. A reflective grating that may be used is a 600 gr/mm, 1850 blaze (3310 FL-660) unit made by Richardson Grating Laboratory, or the dispersive element 204 can be a diffractive element.

FIG. 4 also depicts the relationship between exemplary spectral selection 404, 406, 408, 410 and dispersive element output signals 412, 414, 416, 418. Spectral selection 404 corresponds to dispersive element output signal 412. Spectral selection 406 corresponds to dispersive element output signal 414. Spectral selection 408 corresponds to dispersive element output signal 416. Spectral selection 410 corresponds to dispersive element output signal 418. Although only four dispersive element output signals are shown, this number can be different than four. Four signals are depicted for ease of explanation. Each dispersive element output signal corresponds to a specific transmission peak of the FPI 202 transfer function. In this embodiment, for each FPI 202 setting, signal optical spectral density can be measured simultaneously at four separate wavelengths. Each wavelength measurement may or may not fall at a specific Dense Wave Division Multiplexing (DWDM) channel. As the FPI 202 is driven by a saw-tooth voltage waveform, the distance between the plates of the FPI 202 varies with time. The sampling wavelength continuously sweeps through the entire wavelength range of interest. The saw-tooth waveform is designed such that one sweep of the saw-tooth waveform will result in a bandwidth coverage of M×FSR. In the above example, with 4 dispersive element output signals, M=4. The bandwidth coverage, or total continuous wavelength range, is 4×FSR 306. As the FPI sweeps the frequencies, the dispersive element output signals sweep across the surface of the detector 206 with angle sweeping. A sweep frequency can be in the kilohertz range.

Figure 5:
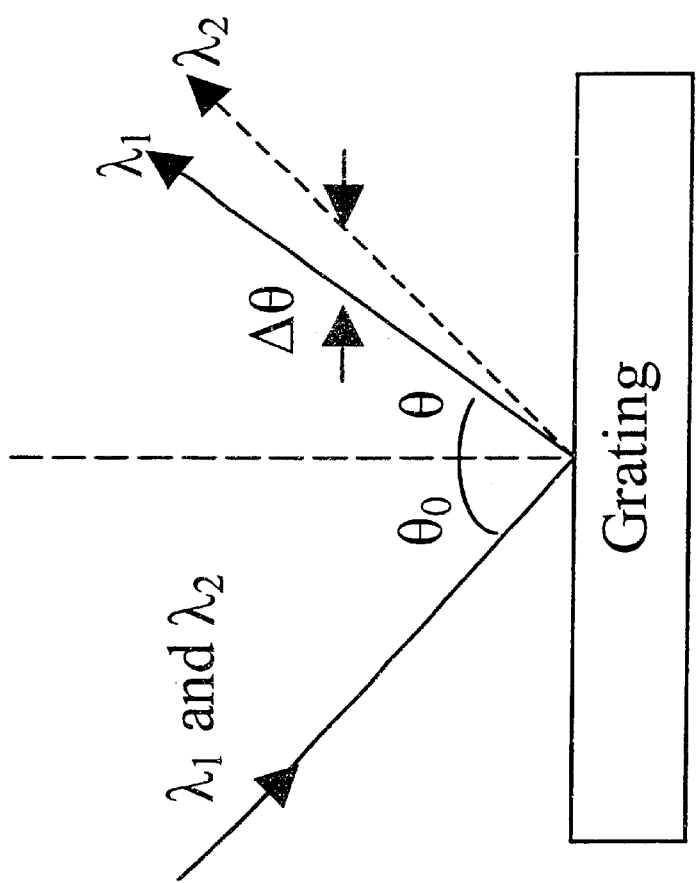
FIG. 5 is a cross-sectional view of a reflective grating of the optical domain signal analyzer of FIG. 2.
Figure 10:
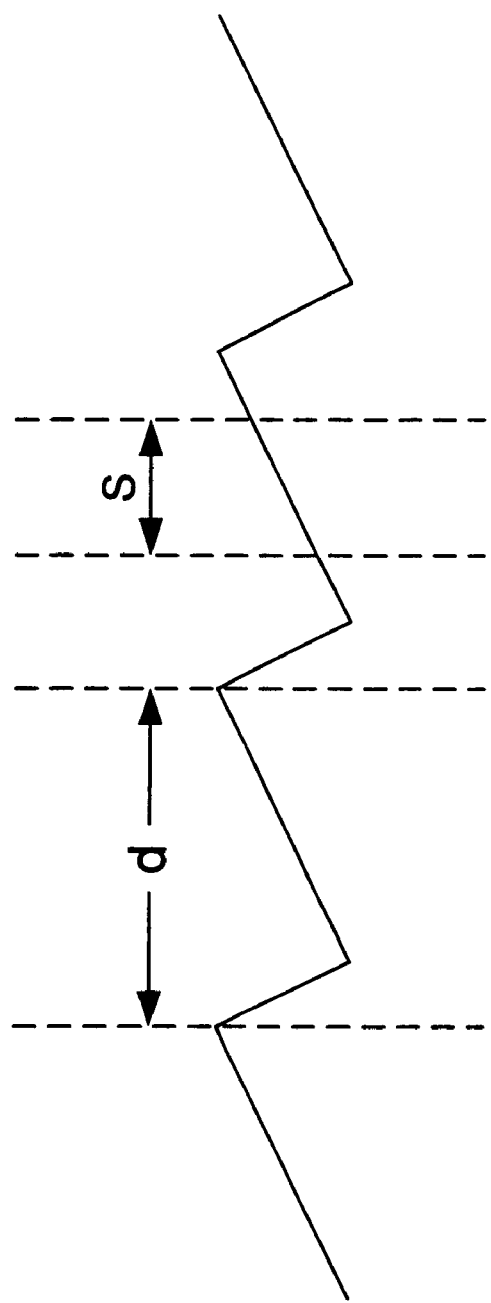
FIG. 10 is an expanded cross-sectional view of the reflective grating of the optical domain signal analyzer of FIG. 2.

FIG. 5 and FIG. 10 illustrate operational details of the grating or dispersive element 204 where a collimated light wave is received comprising wavelengths $\lambda_1$ and $\lambda_2$ and $\lambda_1$ and $\lambda_2$ are dispersed separately. Note the following transfer function $I(\theta)$:

Transfer function (wavelength dependent):

$$I(\theta) \alpha \left( \frac{\sin\left(N \frac{2\pi}{\lambda} \frac{d}{2}(\sin\theta - \sin\theta_0)\right)}{\sin\left(\frac{2\pi}{\lambda} \frac{d}{2}(\sin\theta - \sin\theta_0)\right)} \right)^2 \left( \frac{\sin\left(\frac{2\pi}{\lambda} \frac{s}{2}(\sin\theta - \sin\theta_0)\right)}{\left(\frac{2\pi}{\lambda} \frac{s}{2}(\sin\theta - \sin\theta_0)\right)} \right)^2.$$

As can be seen from the above transfer function, the output intensity $I(\theta)$, is $\lambda$ dependent.

For the first order grating:

$$\Delta\theta = \frac{1}{d} \Delta\lambda$$

Where $\Delta\lambda$ is the filter bandwidth (related to $\Delta v$)

$$\text{or} \quad \Delta\theta = \frac{\lambda}{cd} \Delta v$$

Where:

Input angle $\theta_0$ is fixed.

$(\Delta\lambda = \lambda_1 - \lambda_2)$ and $I = R\rho\Delta v$ therefore $$\rho = \frac{I}{R\Delta v}$$

c=speed of light
$\Delta v$=bandwidth in frequency
$\lambda_0$=center wavelength (1550 nm for example)
R=photodiode responsivity
$\rho$=optical spectral density
d=grating period
n=total grating lines
s=effective line width of grating In a preferred embodiment, each of the dispersive element output signals 412, 414, 416, 418 has a spatial angle width $\delta\phi$ 402. Therefore, the spatial angle width $\delta\phi$ 402, shown as associated with dispersive element output signal 414 in FIG. 4, would be the same $\delta\phi$ for each of the other dispersive element output signals 412, 416, 418.

The dispersive element output signal 414 has a surface signal width $\delta L$ 420 when it reaches the surface of the linear imaging array 306. Each linear imaging array element, or photodiode in a preferred embodiment, has a width of d 422. Thus, there will be:

n=$\delta L$/d, where:

n=number of photodiodes simultaneously illuminated by the corresponding dispersive element output signal, $\delta L$=the surface signal width on a linear imaging array of a dispersive element output signal, and d=width of a linear imaging array element.

The signal processor 208 adds the value of photocurrents received from the n elements of the linear imaging sensor 206. The addition of the photocurrents results in quantity I that is linearly proportional to the signal optical power within the optical bandwidth, width, $\delta v$, 304. Since the dispersive element output signal 412, 414, 416, 418 is spread over n photodiodes, providing for collection of the photocurrent from those n photodiodes, a high tolerance to occasional deficient pixels is achieved.

An example of a detector 206 is a linear imaging sensor, photodiode array model ISC0007-GX manufactured by Indigo Systems. Alternative arrays are LX-Series Linear Indium Gallium Arsenide Photodiode Arrays, manufactured by Sensors Unlimited, Inc.

Figure 6:
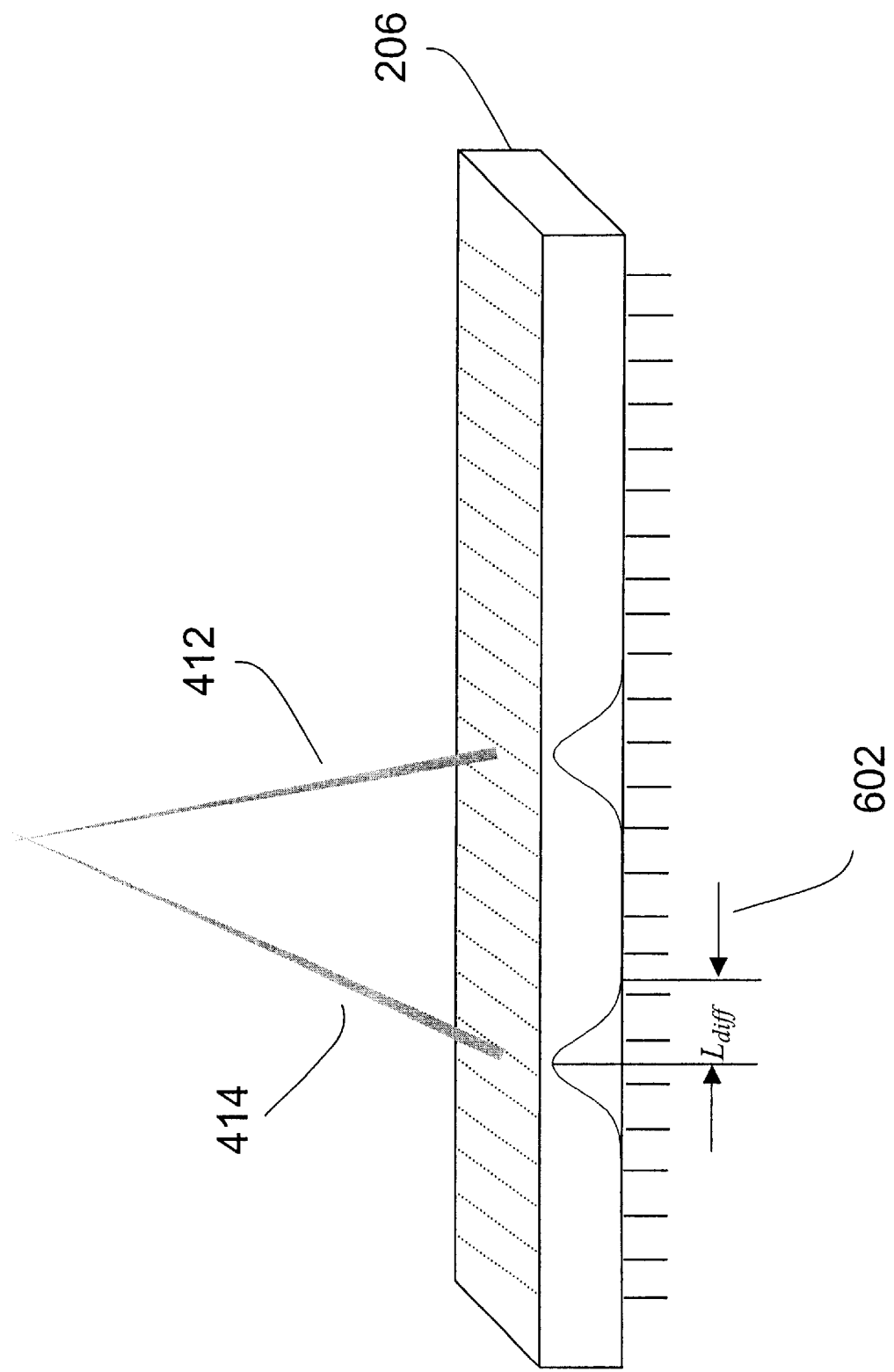
FIG. 6 is a cross-sectional view of a detector of the optical domain signal analyzer of FIG. 2.

Although a small FSR 306 may result in more samples taken within a fixed bandwidth, the FSR 306 is limited by both the angle resolution of the dispersive element and the spatial resolution of the detector 206. The angle resolution $\delta\phi$ of the dispersive element 204 must be smaller than the FSR 306 so that the dispersive element 204 is able to clearly resolve the adjacent FPI transmission peak wavelengths. Also, as shown in FIG. 6, the dispersive element output signal 412, 414 (only two dispersive element output signals are depicted in FIG. 6) may have a Gaussian distribution. This Gaussian distribution is due to carrier diffusion among the adjacent photodiode elements. The width of the Gaussian distribution is diffusion length $L_{diff}$ 602. In order to avoid crosstalk, the minimum separation between the adjacent dispersive element output signals 412, 414 must be wider than twice $L_{diff}$.

Figure 7:
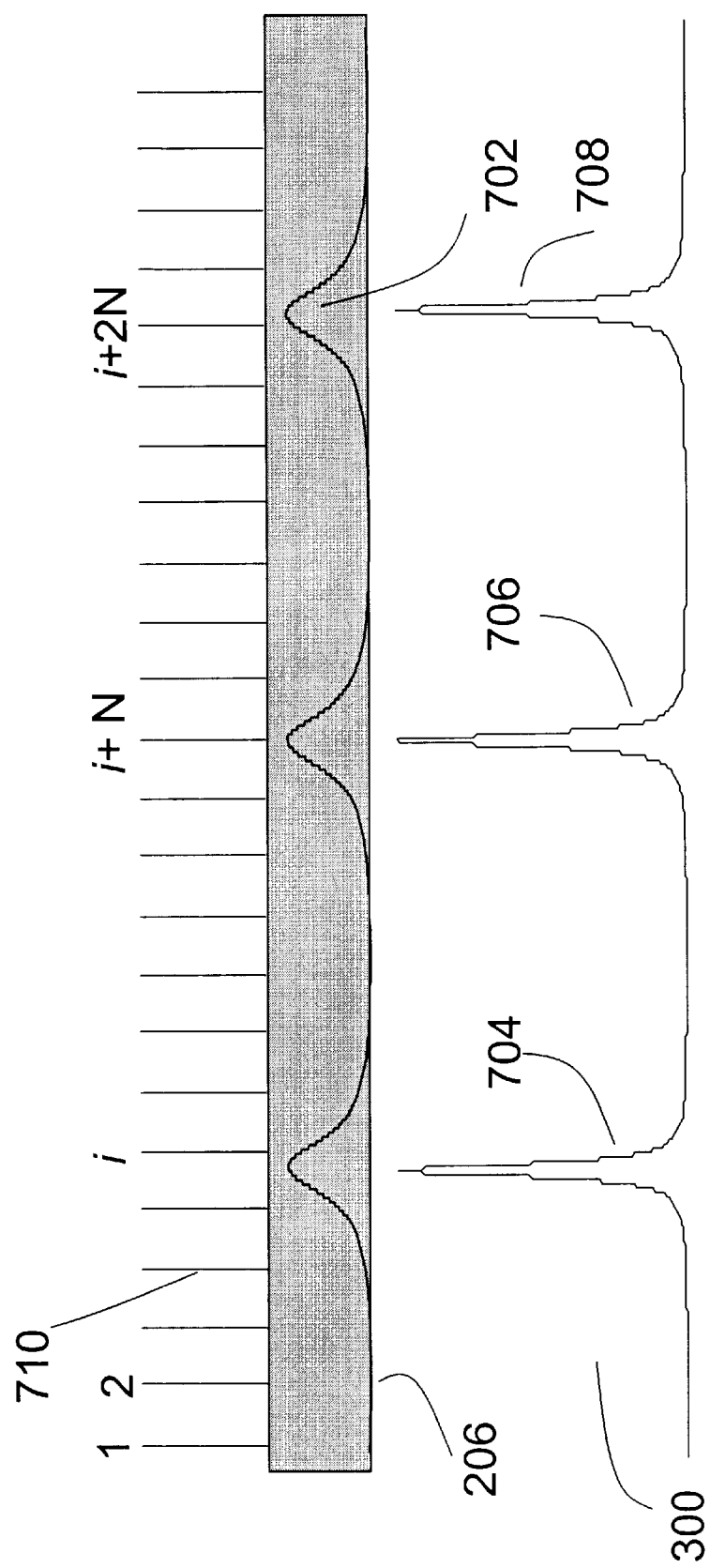
FIG. 7 is another cross-sectional view of a detector of the optical domain signal analyzer of FIG. 2.

Sweep controller 214 provides for calibration of the sweep of the optical filter 202. Recalibration occurs in the event of optical filter transmission peak shifts. These shifts can be random shifts due to temperature. Referring now to FIG. 7, wavelength calibration is illustrated. The FPI transfer function 300 is depicted as to its relationship with the Gaussian distribution 702 on the detector 206. A wavelength calibration can be made for every FPI sweep. In FIG. 7, the FPI sweep is illustrated with 3 peaks 704, 706, 708. As the FSR is known for each FPI peak 704, 706, 708, the corresponding increase in photocurrent is sensed on electrodes 710.

In referring to FIG. 11:

$$\delta\phi = \frac{\phi}{N} \quad \text{— angle resolution of the grating}$$

Since the positions of the reflective grating and the diode array are relatively fixed, each diode element corresponds to a certain wavelength. When an optical filter transmission peak is illuminated on a certain diode element, the wavelength is determined. Further, the FPI 202 has periodic transmission peaks which are equally spaced in frequency. Therefore, photodiode element #i is illuminated. i+N, i+2N, i+3N . . . will be illuminated at the same time. N is the number of diode elements for each FSR of the filter. This helps the increase of the accuracy of the wavelength calibration. Another way for accomplishing wavelength calibration is to use an external wavelength reference. In a preferred embodiment, the calibration is performed once every few minutes.

The signal processor 208 performs electronic sampling of the optical signal detected by various detection elements. This processor is typically built-in within the photodiode array 206.

The data acquisition and interface module 216 can include averaging, interpolating and calibration functions.

Figure 8:
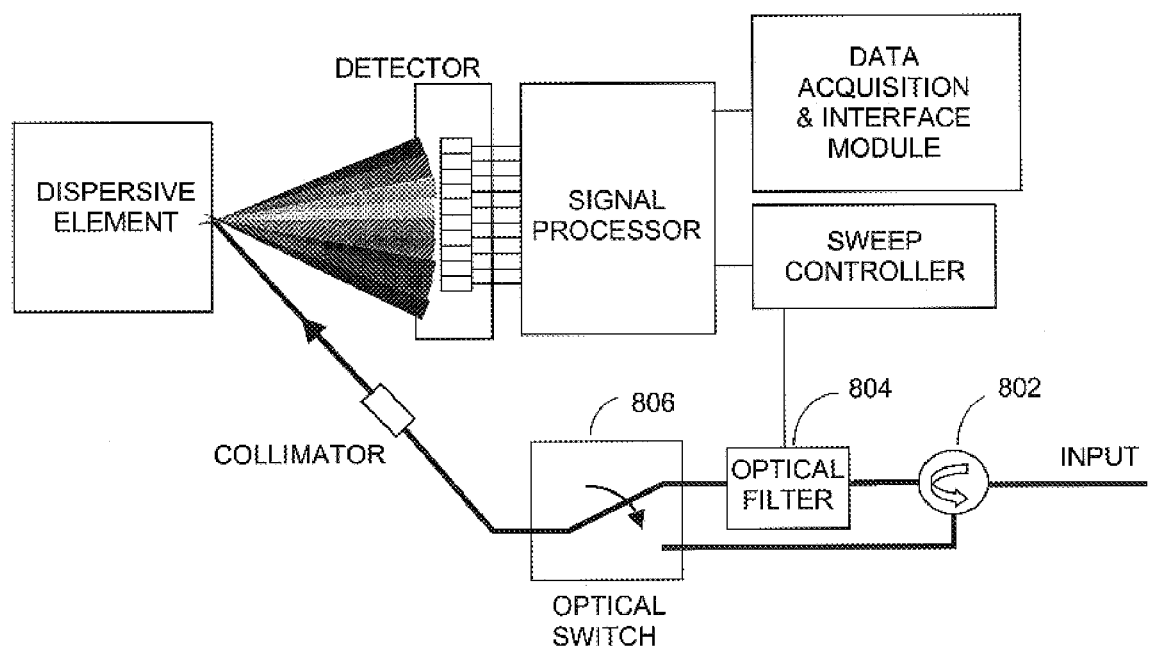
FIG. 8 is a schematic block diagram of another embodiment of an optical domain signal analyzer according to the present invention.

FIG. 8 is a preferred embodiment of an optical domain signal analyzer including noise level measurement with two possible spectral resolutions.

An optical circulator 802 and an optical switch 806 are used in this embodiment. The optical circulator 802 receives a first optical signal and transmits the first optical signal and a reflected signal. The optical filter 804 receives the first optical signal and provides the reflected signal and a second optical signal. The second optical signal comprises a sample of the first optical signal. The optical switch 806 selects between the second optical signal and the reflected optical signal and provides a switched optical signal. A dispersive element receives the switched optical signal and provides a dispersed switched optical signal. The dispersed switched optical signal comprises a dispersion of the selection of the optical switch. A detector receives the dispersed switched optical signal and provides an electrical signal representative of optical characteristics of the dispersed switched optical signal.

A preferred embodiment performs a first sweep of the optical spectrum according to a sweeping transfer function producing a first optical resultant relative to a peak of the sweeping transfer function, disperses the first optical resultant producing a second optical resultant, registers the second optical resultant so as to produce an optical spectral density signal relative to the second optical resultant and performs a second sweep of the optical spectrum according to a reflection mode, the sweeping transfer function producing a third optical resultant relative to the peak of the transfer function. Preferably, the analyzer processes the optical spectral density signal to determine characteristics of the spectrum.

The operation of the optical circulator 802 is such that an input optic signal comes into port A, it will come out from port B. However, when a signal is reflected from the FPI and back into port B, this reflected signal will come out from port C of the circulator. An optical circulator that may be used is a JDS-Uniphase CR5500 series, 3-port optical circulator. Optical switch 806 selects the input either from port 1 or port 2. An optical switch that may be used is a JDS-Uniphase SN series, 3-port optical switch module.

Figure 9:
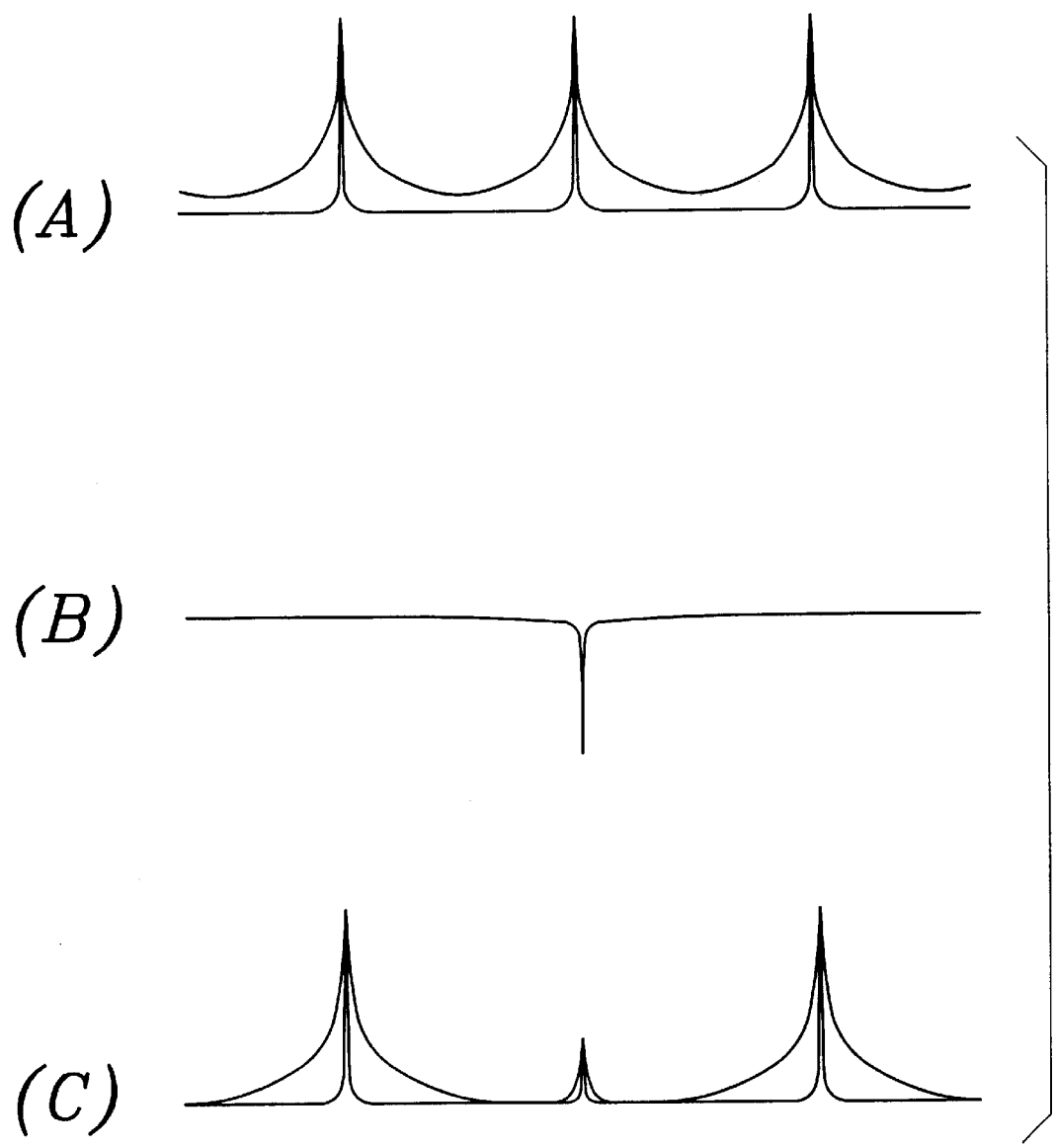
FIG. 9 are exemplary waveforms of the embodiment of the optical domain signal analyzer of FIG. 8.

With the configuration shown in FIG. 8, when the optical switch is at position 1, the operation is the same as described in the last section. An exemplary waveform of the signal analyzer is shown in FIG. 9a. But when the switch is set at position 2, the FPI works in the reflection mode. As shown in FIG. 9b, when an FPI works in the reflection mode, it is a periodic optical notch filter. In this mode, the spectral resolution of the spectrum analyzer is determined only by the reflective grating and the linear imaging array combination. Since the FPI 804 works as an optical notch filter, when its notch wavelength is tuned to an optical signal, it suppresses the optical signal (its power density is usually much higher than the noise) and makes the noise measurement less interfered by the presence of a powerful optical signal. This arrangement increases the accuracy of optical noise measurement. A waveform illustrating the effect of the reflective mode on the signal analyzer is shown in FIG. 9c.

The sweep controller calibrates the first and second sweeps of the optical spectrum.

Thus, an Optical Domain Signal Analyzer is disclosed which utilizes an optical filter to provide high resolution spectrum analysis over a wide optical bandwidth. While preferred embodiments and particular applications of this invention have been shown and described, it is apparent to those skilled in the art that many other modifications and applications of this invention are possible without departing from the inventive concepts herein. It is, therefore, to be understood that, within the scope of the appended claims, this invention may be practiced otherwise than as specifically described, and the invention is not to be restricted except in the spirit of the appended claims. Though some of the features of the invention may be claimed in dependency, each feature has merit if used independently.

What is claimed is:

1. An analyzer for analyzing an optical spectrum comprising:
    a tunable wavelength sampling optical filter providing optical spectrum sweeping, for receiving a first optical signal and providing a second optical signal, the second optical signal comprising a wavelength sample of the first optical signal;
    a dispersive element for receiving the second optical signal and providing a third optical signal, the third optical signal comprising a dispersion of the second optical signal; and
    a detector for receiving the third optical signal and providing an electrical signal representative of optical characteristics of the third signal.

2. The analyzer as claimed in claim 1 further including a processor for receiving the electrical signal representative of the optical characteristics of the third signal and calculating the characteristics of the spectrum.

3. The analyzer as claimed in claim 1 wherein the detector is a photo detector.

4. The analyzer as claimed in claim 3 wherein the photo detector is a linear imaging sensor.

5. The analyzer as claimed in claim 4 wherein the linear imaging sensor is a photo diode array.

6. The analyzer as claimed in claim 1 wherein the optical filter is a Fabry-Perot interferometer.

7. The analyzer as claimed in claim 1 further including a sweep controller for calibration.

8. The analyzer as claimed in claim 1, further including an optical circulator for transmitting the first optical signal and a reflected signal; and
    an optical switch that receives both the first optical signal as transmitted and the reflected optical signal, selects between the first optical signal and the reflected optical signal and transmits the selected optical signal to the dispersive element.

9. An analyzer for analyzing an optical spectrum comprising:
    an optical circulator for receiving a first optical signal and transmitting the first optical signal and a reflected signal;
    a tunable wavelength sampling optical filter for receiving the first optical signal and providing the reflected signal and a second transmitted optical signal, the second transmitted optical signal comprising a wavelength sample of the first optical signal;
    an optical switch for selecting between the second transmitted optical signal and the reflected optical signal and providing a switched optical signal; and
    a dispersive element for receiving the switched optical signal and providing a dispersed switched optical signal, the dispersed switched optical signal comprising a dispersion of the selection of the optical switch; and
    a detector for receiving the dispersed switched optical signal and providing an electrical signal representative of optical characteristics of the dispersed switched optical signal.

10. The analyzer as claimed in claim 9 further including a processor for receiving the electrical signal and calculating the characteristics of the spectrum.

11. The analyzer as claimed in claim 9 wherein the detector is a photo detector.

12. The analyzer as claimed in claim 11 wherein the photo detector is a linear imaging sensor.

13. The analyzer as claimed in claim 12 wherein the linear imaging sensor is a photo diode array.

14. The analyzer as claimed in claim 9 wherein the optical filter is a Fabry-Perot interferometer.

15. The analyzer as claimed in claim 9 further including a sweep controller for calibration.

16. A method of analyzing an optical spectrum comprising:

continuous sweeping of the optical spectrum of a first optical signal with a tunable wavelength sampling optical filter according to a sweeping transfer function to produce a first optical wavelength sampled resultant relative to a peak of the sweeping transfer function;

dispersing the first optical resultant producing a second optical resultant; and registering the second optical resultant so as to produce an optical spectral density signal relative to the second resultant optical signal.

17. The method as claimed in claim 16 further including processing the optical spectral density signal to determine characteristics of the spectrum.

18. The method as claimed in claim 16 wherein the dispersing is achieved through reflecting.

19. The method as claimed in claim 16 wherein the dispersing is achieved through diffracting.

20. The method as claimed in claim 16 further including sweeping of the optical spectrum according to a reflection mode, the sweeping transfer function producing a third optical resultant relative to the peak of the transfer function.

21. The method as claimed in claim 16 further including calibrating the sweeping of the optical spectrum according to a sweeping transfer function.

22. The method as claimed in claim 21 further including calibrating the sweeping of the optical spectrum according to a reflection mode.

23. A method of analyzing an optical spectrum comprising:

performing a first sweep of the optical spectrum of a first optical signal with a tunable wavelength sampling optical filter according to a sweeping transfer function producing a first optical wavelength sampled resultant relative to a peak of the sweeping transfer function;

dispersing the first optical resultant producing a second optical resultant;

registering the second optical resultant so as to produce an optical spectral density signal relative to the second optical resultant; and performing a second sweep of the optical spectrum according to a reflection mode, the sweeping transfer function producing a third optical resultant relative to the peak of the transfer function.

24. The method as claimed in claim 23 further including calibrating the first and second sweeps of the optical spectrum.

25. The method as claimed in claim 23 further including processing the optical spectral density signal to determine characteristics of the spectrum.

26. The method as claimed in claim 23 wherein the dispersing is achieved through reflecting.

27. The method as claimed in claim 23 wherein the dispersing is achieved through diffracting.

28. An analyzer for analyzing an optical frequency spectrum comprising:

a tunable wavelength sampling optical filter providing continuous linear optical spectrum sweeping, for receiving a first optical signal and providing a second optical signal, the second optical signal comprising a wavelength sample of the first optical signal;

a dispersive element for receiving the second optical signal and providing a third optical signal, the third optical signal comprising a dispersion of the second optical signal; and a detector for receiving the third optical signal and providing an electrical signal representative of optical characteristics of the third signal.

* * * * *